United States Patent [19]

Ozaki et al.

[11] Patent Number: 4,796,248
[45] Date of Patent: Jan. 3, 1989

[54] OBJECTIVE LENS DRIVE DEVICE

[75] Inventors: Hiroshi Ozaki; Kouichi Ikebe, both of Amagasaki, Japan

[73] Assignee: Mitsubishi Denki Kabushiki Kaisha, Tokyo, Japan

[21] Appl. No.: 196,554

[22] Filed: May 20, 1988

[30] Foreign Application Priority Data

May 26, 1987 [JP] Japan ............................... 62-80210[U]

[51] Int. Cl.⁴ ............................................... G11B 7/12
[52] U.S. Cl. ...................................... 369/45; 350/255
[58] Field of Search .................... 369/44, 45, 46, 112; 350/245, 247, 255, 6.3; 250/201 DF

[56] References Cited

U.S. PATENT DOCUMENTS

| | | | |
|---|---|---|---|
| 4,253,723 | 3/1981 | Kojima et al. | 369/46 |
| 4,419,614 | 12/1983 | Kimura | 369/46 |
| 4,566,089 | 1/1986 | Kime | 369/45 |
| 4,571,026 | 2/1986 | Maruta | 350/247 |
| 4,644,516 | 2/1987 | Musha | 369/45 |
| 4,678,276 | 7/1987 | Sekimoto et al. | 350/247 |
| 4,687,296 | 8/1987 | Terayama et al. | 350/247 |

FOREIGN PATENT DOCUMENTS 61-198436 9/1986 Japan .
62-18631 1/1987 Japan .

*Primary Examiner*—Donald McElheny, Jr.
*Attorney, Agent, or Firm*—Fleit, Jacobson, Cohn & Price

[57] ABSTRACT

A tracking error signal is generated by a far field system utilizing light for writing and reading of data. The true tracking error signal is retrieved from this tracking error signal by removing the position fluctuation component in the direction of tracking of the objective lens. A holding member that is supported on a frame and holds the objective lens is driven in the tracking direction in accordance with this true tracking error signal. In order to detect position fluctuation in the tracking direction of the objective lens, the light for position detection that is output from the holding member is detected by a photodetector fixed on a cover. The mounting position of the cover with respect to the frame is adjustable by rotating the cover, using the guide part formed on the frame.

6 Claims, 2 Drawing Sheets

OBJECTIVE LENS DRIVE DEVICE

BACKGROUND OF THE INVENTION

This invention relates to an objective lens drive device in an optical disk device etc.

When data is written to and read from a disk in an optical disk device, it is necessary that the light which is used for writing and reading is focused on to the disk, and that the spot produced by this light follows a track. Normally, for the purposes of this focus control and tracking control, an objective lens that directs and focuses this light on to the disk is arranged to be moved in the focusing direction, i.e. perpendicular to the disk, and also in the tracking direction, i.e. perpendicular to the track.

Various methods for tracking control have been proposed. In an optical video disk device, for example, "three-beam" system is adopted. In this system, apart from a single main beam for data reading, two auxiliary beams are used for tracking. If this system is applied to a device for writing data on disks, there is a risk that data may be destroyed by the auxiliary beams. Accordingly, in a device that performs not just reading but also writing, a "far field" system ("push-pull" system) is often adopted, wherein the single beam for data writing and reading is also used for tracking. However, this system has a drawback that a component corresponding to the variation in the light amount that is produced by the movement of the beam is superimposed on the tracking error signal.

A method for solving this problem has been disclosed in Japanese Patent Application Laid-Open No. 198436/1986. In this method, the light that is output from a light source is directed on to the disk through an objective lens. The reflected light is received by a first photodetector that is divided into two photodetection elements in the direction parallel to the track. The difference in outputs of this pair of photodetection elements is used to generate a far field tracking error signal $T_1$. Additionally, the light that is output from the light source is divided, and part of it is input to a slit that is moved in the tracking direction in association with the movement of the objective lens. The light which is output from the slit is received by a second photodetector fixed at a prescribed position. The second photodetector is also divided into two photodetection elements. From the difference in outputs of this pair of photodetection elements, a signal $T_2$ is generated, corresponding to the fluctuation in position of the objective lens (light spot on the disk) in the tracking direction. In the output signal $T_1$ of the first photodetector, the true tracking error signal $T_3$ and the objective lens position fluctuation signal $T_2$ are superimposed. Consequently, the true tracking error signal $T_3$ is derived from the difference between the outputs of the first photodetector and the second photodetector.

If this system is applied to an objective lens drive device as disclosed in for example Japanese Patent Application Laid-Open No. 18631/1987, the construction shown in FIGS. 4, 5 and 6 would be obtained.

In these figures, 1 is a main frame of an objective lens drive device, 2 is a support shaft which is fixed on to main frame 1, 3 is an objective lens that focuses and directs a light on to a disk (not shown), forming a light spot, and 4 is an objective lens holding member that supports objective lens 3 in a manner such that its optic axis is parallel with support shaft 2, being freely slidable along and rotatable about support shaft 2. 5 is a coil for control in the focusing direction, being wound on coil bobbin 6 which is formed at the periphery of holding member 4. 7 is a coil for control in the tracking direction, being fixed on the coil 5. 8 is an outside yoke facing the outside of coil 5 and being fixed to main frame 1. 9 is an inside yoke that is arranged opposite outside yoke 8. 10 is a permanent magnet for control in the focusing direction, forming a magnetic circuit with yokes 8 and 9. 11 is a yoke fixed to main frame 1. 12 is a permanent magnet for control in the tracking direction, being fixed to yoke 11 and facing the outside of coil 7. Thus coil 7 is arranged in a magnetic circuit for tracking provided with yoke 11 and permanent magnet 12. Main frame 1 has a hole 13 to allow passage of light for writing and reading, and a hole 14 to allow passage of light for position detection, which is divided from the light for writing and reading. Holding member 4 is provided with a slit 15 on a straight line (on a radius) in the diametric direction passing through the center of rotation of support shaft 2. A photodetector 16, which is divided into two photodetection elements, is fixed on the underside of a cover 17, in such a way that the line of its division is contained in a plane including the center line of slit 15 when holding member 4 is in a reference position. Photodetector 16 constituting the aforementioned second photodetector (for position detection of the objective lens) is divided into two photodetection elements 16a and 16b by the dividing line. Cover 17 protects the above components, and is provided with a hole 18 through which the light that is output from objective lens 3 passes.

The operation will now be described. When misalignment of the focal point of light incident on to the disk through the objective lens is detected by means, not shown, a current corresponding to the amount of this misalignment (focus error) flows in coil 5, and acts, with the magnetic field produced by permanent magnet 10, to drive holding member 4 (objective lens 3) in the direction of the axis of support shaft 2. An elastic member (not shown) is provided between holding member 4 and yoke 11 or another fixed part on main frame 1, and focusing control is performed about the position of this elastic member as center.

A signal accurately corresponding to the misalignment, with respect to the track on the disk, of the spot of light projected from objective lens 3 is generated utilizing the outputs of aforementioned first (tracking error detecting) photodetector, not shown, and photodetector 16, which is the second photodetector. A current corresponding to this amount of misalignment (tracking error) flows in coil 7, and acts with the magnetic field of magnet 12, to produce rotation of holding member 4 (objective lens 3) about the axis of support shaft 2. Tracking control is performed about the position of an elatic member as center, in the same way as in the case of focusing control.

The light for position detection is parallel light and is guided into hole 14 of main frame 1 and output from slit 15 provided on a straight line passing through the center of rotation of holding member 4 that moves in unison with objective lens 3. Photodetection elements 16a and 16b are disposed in a manner such that the dividing line of photodetector 16 passes through the center of the output light of slit 15 when objective lens 3 is in the reference position. That is, if we represent the output signal of photodetection element 16a by A, and the output signal of photodetection element 16b by B, objective lens is adjusted in the reference position in which A=B. If objective lens 3 moves in the tracking direction (direction of rotation), A or B becomes greater than B or A, so the amount of misalignment from the reference position of the objective lens can be detected.

The objective lens drive device described above has to be adjusted such that the beam that passes through the slit is symmetric with respect to the dividing line of the photodetector when the objective lens is in the reference position for position detection in the tracking direction. This results in the problem that the cover must be adjusted relative to the main frame after mounting the photodetector on the cover, which is troublesome and time-consuming.

SUMMARY OF THE INVENTION

An object of the invention is to solve the aforementioned problem.

Another object of the invention is to obtain an objective lens drive device wherein the cover can easily be adjusted with respect to the main frame after the photodetector for position detection is mounted on the rear face of the cover.

According to the invention, there is provided an objective lens drive device comprising a holding member for holding an objective lens that directs a first beam of light on to a disk for writing or reading data, a support shaft for supporting the holding member slidably in the focusing direction and rotatably in the tracking direction, a photodetector for detecting a second beam of light for detection of the position of the objective lens, the second beam of light being output from the holding member, a frame on which the support shaft is mounted, a cover on which the photodetector is mounted, and a drive means, arranged on the holding member and the frame, that drives the holding member in the focusing direction and tracking direction, wherein said frame has a guide part that constitutes at least a part of a circle whose center coincides with the center of said support shaft, and said cover has a cylindrical side wall that is guided by said guide part so that said cover can rotate about said support shaft as center.

In the invention, a photodetector for position detection, which is divided into two photodetection elements, is arranged on an underside of a cover having a cylindrical side wall, the dividing line being a straight line (radius) passing through the center of the cylinder, and a guide member for rotation is provided on a main frame so that the cover can rotate concentrically with the center of rotation of an objective lens. Therefore rotational fine adjustment of the cover becomes easy, and positional adjustment of the photodetector can be effected accurately.

DETAILED DESCRIPTION OF THE PREFERRED EMBODIMENT

Figure 1:
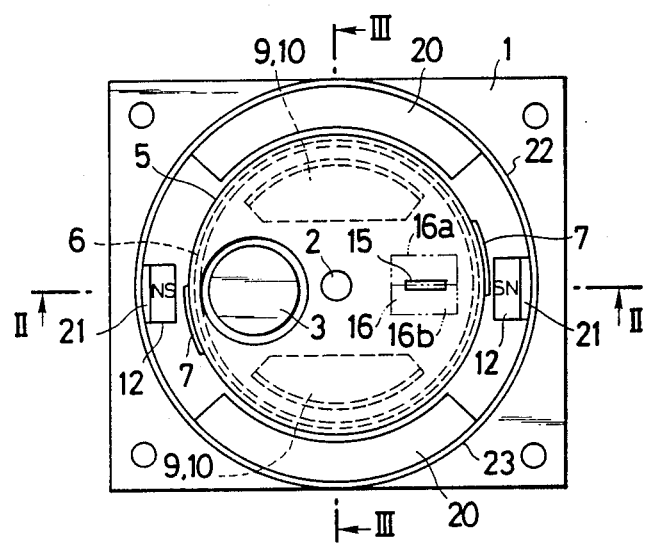
FIG. 1 is a plane view looking through a cover of an objective lens drive device according to the invention.
Figure 2:
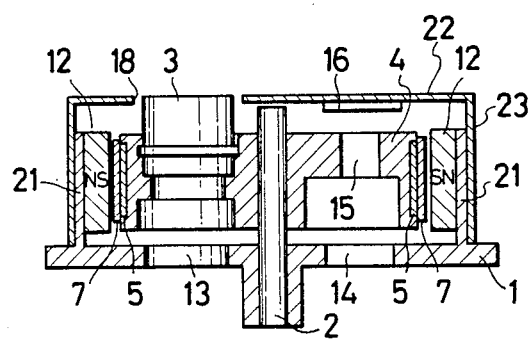
FIG. 2 is a cross-sectional view along the line II—II in FIG. 1.
Figure 3:
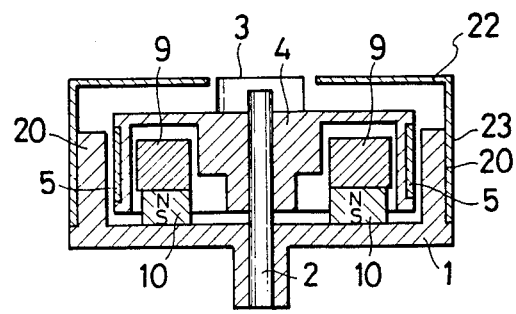
FIG. 3 is a cross-sectional view along the line III—III in FIG. 1.
Figure 4:
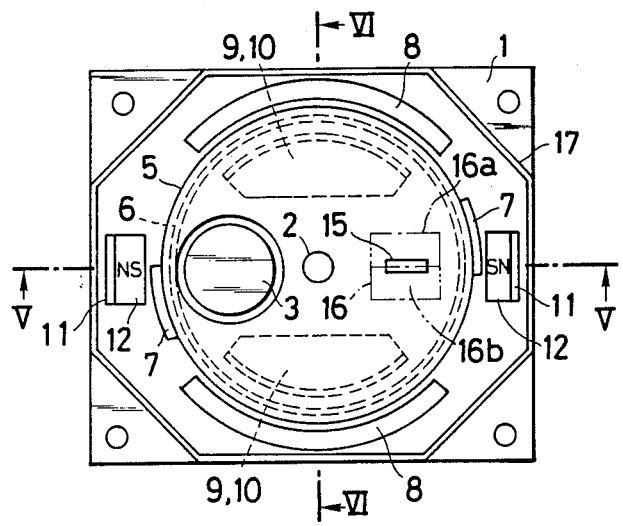
FIG. 4 is a plane view looking through a cover of an objective lens drive device which would result if teachings in the prior art are hypothetically combined.
Figure 5:
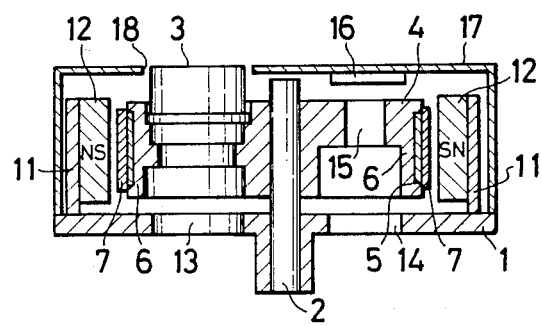
FIG. 5 is a cross-sectional view along the line V—V of FIG. 4.
Figure 6:
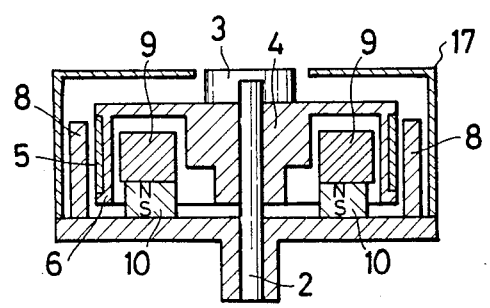
FIG. 6 is a cross-sectional view along the line VI—VI of FIG. 4.

An embodiment of this invention will now be described with reference to FIG. 1 to FIG. 3. In these drawings, 1 to 7, 9, 10, 12 to 16, 16a, 16b and 18 designate the same elements as in the device shown in FIG. 4 to FIG. 6. 20 is an outside yoke that forms a magnetic circuit for focusing control and is unitary with main frame 1, and 21 is a yoke for tracking control that is unitary with main frame 1. These yokes are made with the same external diameter and concentric with the center of rotation of objective lens 3. 22 is a cover of approximately circular shape when seen from above, which has a cylindrical side wall 23 at its periphery. The internal diameter of cylindrical side wall 23 approximately corresponds to the external diameters of yokes 20 and 21, so that cover 22 fits to these two yokes 20 and 21. On the underside of cover 22 there are mounted a pair of photodetection elements 16a and 16b for position detection, their centerline of symmetry being a straight line (radius) passing through the center of the cylinder. Thus, the center of the circle formed by the periphery of yokes 20 and 21 coincides with the center of support shaft 2, and cylindrical side wall 23 of cover 22 fits to the periphery of these yokes 20 and 21, so, as a result, the center of the cylinder of the cover coincides with the center of support shaft 2. Furthermore, the internal diameter of cylindrical side wall 23 of cover 22 approximately corresponds to the external diameter of yokes 20 and 21, so cover 22 is guided by yokes 20 and 21 and can rotate without rattling. Photodetection elements 16a and 16b are arranged symmetrically about a centerline constituted by a radius of the cylinder of cover 22, so even if cover 22 rotates to any position, the dividing line of photodetector 16 coincides with a radius of support shaft 2. Consequently, the position of the dividing line of photodetector 16 can be adjusted with respect to slit 15 by rotating cover 22. That is, since the light for position detection is input to photodetector 16 through hole 14 and slit 15 of main frame 1, cover 22 is adjusted by slight rotation in the clockwise or anticlockwise direction so as to make the output signals of photodetection elements 16a and 16b the same when objective lens 3 is in the reference position. Cover 22 is then fixed to main frame 1 by means such as adhesion or screwing, in a position where the difference between the two output signals is zero. Since cover 22 is fixed in a condition in which it is fitted to yokes 20 and 21, there is little likelihood of movement even if external forces are applied. Consequently, occurrence of offset due to photodetector misalignment caused by cover movement is practically eliminated.

In the above embodiment, the light for position detection is directed on to photodetector 16 through a hole constituted by a slit of rectangular cross-section. However, the cross-sectional shape of this hole could be circular. Furthermore, a light source for position detection separate from a light source for writing and reading could be mounted on holding member 4, so that light output from this light source is received at photodetector 16. In this case, there is no need to form a slit or hole etc. in holding member 4.

Also, in the above embodiment, yokes 20 and 21 are formed integral with main frame 1, so main frame 1 is also made of a magnetically permeable material, and main frame 1 also constitutes part of the magnetic circuit for tracking and focusing. In this case, positioning of yokes 20 and 21 is easier. However, it is also possible to make yokes 20 and 21 separate from main frame 1, and to fix them to main frame 1. In this case, main frame 1 can be made of magnetically permeable or magnetically non-permeable material. In the latter case, main frame 1 does not constitute part of the magnetic circuit. Making the main frame 1 of magnetically permeable material can produce a large drive force with a coil of a smaller number of windings, since the magnetic circuit forms a closed loop. Moreover, in the above embodiment, yokes 20 and 21 also serve as guide parts for cover 22. However, it is also possible to provide guide parts separate from yokes 20 and 21.

Furthermore, as drive means for driving holding member 4 in the focusing direction and tracking direction, magnets 10 and 12 are arranged on main frame 1, and coils 5 and 7 are arranged on holding member 4 respectively. However, this arrangement could be reversed.

What is claimed is:

1. An objective lens drive device comprising
   a holding member for holding an objective lens that directs a first beam of light on to a disk for writing or reading data,
   a support shaft for supporting the holding member slidably in the focusing direction and rotatably in the tracking direction,
   a photodetector for detecting a second beam of light for detection of the position of the objective lens, the second beam of light being output from the holding member,
   a frame on which the support shaft is mounted,
   a cover on which the photodetector is mounted, and
   a drive means, arranged on the holding member and the frame, that drives the holding member in the focusing direction and tracking direction,
   wherein said frame has a guide part that constitutes at least a part of a circle whose center coincides with the center of said support shaft,
   and said cover has a cylindrical side wall that is guided by said guide part so that said cover can rotate about said support shaft as center.

2. An objective lens drive device according to claim 1 wherein said guide part is a yoke that forms part of said drive means.

3. An objective lens drive device according to claim 1 wherein said frame is made of magnetically permeable material.

4. An objective lens drive device according to claim 2 wherein said frame is made of magnetically permeable material and said yoke is formed integral with the frame.

5. An objective lens drive device according to claim 1 wherein said holding member has a hole through which said second beam of light passes.

6. An objective lens drive device according to claim 1 wherein a light source that generates said second beam of light is mounted on said holding member.

* * * * *